United States Patent
Mora

(10) Patent No.: US 6,571,789 B1
(45) Date of Patent: Jun. 3, 2003

(54) HIGH EFFICIENCY SWIMMING POOL OR COMMERCIAL LIQUID TANK INSULATION DEVICE

(75) Inventor: Jorge O. Mora, San Diego, CA (US)

(73) Assignee: Paul C. Pickert, Palo Alto, CA (US)

( * ) Notice: Subject to any disclaimer, the term of this patent is extended or adjusted under 35 U.S.C. 154(b) by 0 days.

(21) Appl. No.: 10/282,431

(22) Filed: Oct. 28, 2002

(51) Int. Cl.$^7$ ................................................. F24J 2/42
(52) U.S. Cl. .......................... 126/565; 126/566; 4/493; 4/498
(58) Field of Search ................................ 126/561, 563, 126/564, 565, 566, 624, 625; 4/493, 498, 499, 488, 489; 220/216

(56) References Cited

U.S. PATENT DOCUMENTS

| | | | | |
|---|---|---|---|---|
| 3,893,443 A | * | 7/1975 | Smith | 126/565 |
| 4,022,187 A | * | 5/1977 | Roberts | 126/565 |
| 4,270,232 A | * | 6/1981 | Ballew | 4/498 |
| 4,284,060 A | * | 8/1981 | McCluskey | 4/498 |
| 4,749,606 A | * | 6/1988 | Moore | 126/561 |
| 4,875,466 A | * | 10/1989 | Slonneger | 126/565 |
| 5,511,536 A | * | 4/1996 | Bussey, Jr. | 126/565 |

* cited by examiner

*Primary Examiner*—James C. Yeung
(74) *Attorney, Agent, or Firm*—John J. Leavitt

(57) ABSTRACT

Presented is an improved insulation device which, in multiple numbers, forms a swimming pool cover, or cover for other types of liquid containers. A complete cover is formed of multiple independent floatation insulation devices that collectively cover the entire surface of the water or liquid on which they float, yet enable dispersion thereof as a safety feature from below the surface of the water or liquid by a person in the water so that the person may extend his or her head through the cover to breath air. Structurally, the insulation device is hexagonal so as to cooperatively abut adjacent insulation devices to form a complete cover. The insulation device is injection molded-from plastic in two mirror image half-shells each of which is formed with a circular recess centrally disposed within the hexagonal outer periphery. Placing the two mirror image half-shells in confronting abutting position and sonic or electronic welding the union between them forms a unitary insulation device that disperses light and heat energy from the sun into the body of liquid on which the device floats. At least one surface of one of the circular recess is provided with a very thin layer of metal or silicon dioxide to form a "hot mirror" surface that functions to reflect back into the body of liquid heat energy that reflects from the bottom of the liquid container, be it the bottom of the swimming pool or the bottom of a container storing other types of liquids that require temperature management.

15 Claims, 3 Drawing Sheets

HIGH EFFICIENCY SWIMMING POOL OR COMMERCIAL LIQUID TANK INSULATION DEVICE

BACKGROUND OF THE INVENTION

1. Field of the Invention

This invention relates broadly to floatation means for covering bodies of liquid such as water in a swimming pool, or other liquids such as oil or gasoline contained in open top containers or earthen basins. More particularly, the invention relates to a specifically shaped and constructed floatation device which, when associated with a sufficient number of similarly shaped and constructed floatation devices, cooperate to fully cover the surface of the liquid on which they float and function to transmit sunlight and thermal energy into the body of liquid while inhibiting the escape into the surrounding atmosphere of light and thermal energy from the body of liquid.

2. Description of the Prior Art

A preliminary patentability and novelty search has revealed the existence of the following United States Patents:

| | | | |
|---|---|---|---|
| 3,072,920 | 3,340,553 | 3,405,410 | 3,453,666 |
| 3,462,040 | 3,683,428 | 3,694,837 | 3,769,639 |
| 3,842,768 | 3,872,522 | 3,874,987 | 3,927,427 |
| 3,938,338 | 3,998,204 | 4,028,750 | 4,137,575 |
| 4,139,117 | 4,146,015 | 4,166,146 | 4,213,280 |
| 4,222,366 | 4,270,232 | 4,366,806 | 4,429,683 |
| 4,577,352 | 4,601,072 | 4,628,549 | 4,749,606 |

Bodies of liquid, such as swimming pools, are covered for various reasons and by various structures as illustrated and described in the United States patents listed above, none of which appear to disclose the specific structure and function of the instant invention. One of the primary reasons is to prevent the collection of debri on the surface of the water, the debri being collected instead on the upper surface of the cover device from whence it may be blown off by wind or other mechanical type blower devices, thus preventing contamination of the swimming pool water. Another reason is to prevent the swimming pool from being used. These types of covers are usually sheet-like in their construction, covering the water with a debri impenetrable membrane that is frequently deployed and retracted by mechanical means. One disadvantage of this type of cover on a swimming pool is that if a child accidentally falls onto the pool cover and slips into the water beneath the cover, it is very difficult for the child to escape from under the membrane and it is difficult for others in the area to visually discern that a child has become trapped under the cover. These types of impenetrable covers are also used to prevent the evaporation into the atmosphere of water from the swimming pool.

Accordingly, one of the important objects of the cover device for liquids forming the subject matter of the instant invention is the provision of a cover device that will enable light and thermal energy to penetrate into the body of liquid to effectively manage the temperature of the liquid but will inhibit the transference of thermal energy from the body of liquid into the atmosphere.

Another object of the invention is to provide a cover device for liquids, which when associated with other like devices, will completely cover the surface of the liquid yet enable a person who accidently falls into the liquid to rise through and above the multiple cover devices so as to enable breathing of atmospheric air.

Still another object of the invention is the provision of a swimming pool cover formed from a multiplicity of separate, physically abutting yet separable hexagonal devices that are transparent to sunlight and thermal energy from the sun but which are non-transparent to thermal energy reflected from the bottom of the swimming pool.

A still further object of the invention is the provision of a prefabricated hexagonal floatation device formed with oppositely facing concave surfaces forming lenses which when associated with multiple similar devices cooperate to transmit into and disperse sunlight and thermal energy through the lenses and into the body of liquid covered by the multiple devices.

Yet another object of the invention is the provision of a prefabricated hexagonal floatation device as described in the preceding paragraph which is provided with a layer of reflective material applied to at least one of the concave surfaces of the device.

The invention possesses other features of advantage, some of which, with the foregoing, will become apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the swimming pool or commercial liquid tank insulation device of the invention comprises a specifically configured and dimensioned body of floatation material, preferably plastic, formed preferably in a hexagonal configuration in a selected size. For ease and economy of fabrication, the floatation device is injection molded in two identical halves, each formed with a peripheral flange, a first face that intercepts and is joined to the peripheral flange at its outer periphery and which face is provided with a centrally located concavity having a centrally located apertured lug projecting from the convex second surface of the front face. When the two halves of the device are mated so that their peripheral flanges abut, the central lugs abut and the concave surfaces face in opposite directions. The edges of the peripheral flanges of the two halves are then sealingly joined about their peripheries, as are the two abutting centrally positioned lugs, so that an annular hollow interior is formed between the outer peripheries of the flanges and the centrally positioned abutting lugs which are also sealingly joined. The light weight of the plastic from which the two halves are formed and the formation of a sealed hollow interior enables the device to float in the water or liquid, with at one of the concave lens-like surfaces being exposed to the sunlight during daylight hours. The concave lens-like surface transmits light and thermal energy through the opposite face of the device and into the body of liquid supporting the device. In one aspect of the invention, a thin layer of light and thermal energy transmissive material is applied to one or both of the concave surfaces to prevent thermal energy from passing from the body of liquid back into the atmosphere.

DETAILED DESCRIPTION OF THE INVENTION

Figures 1, 8:
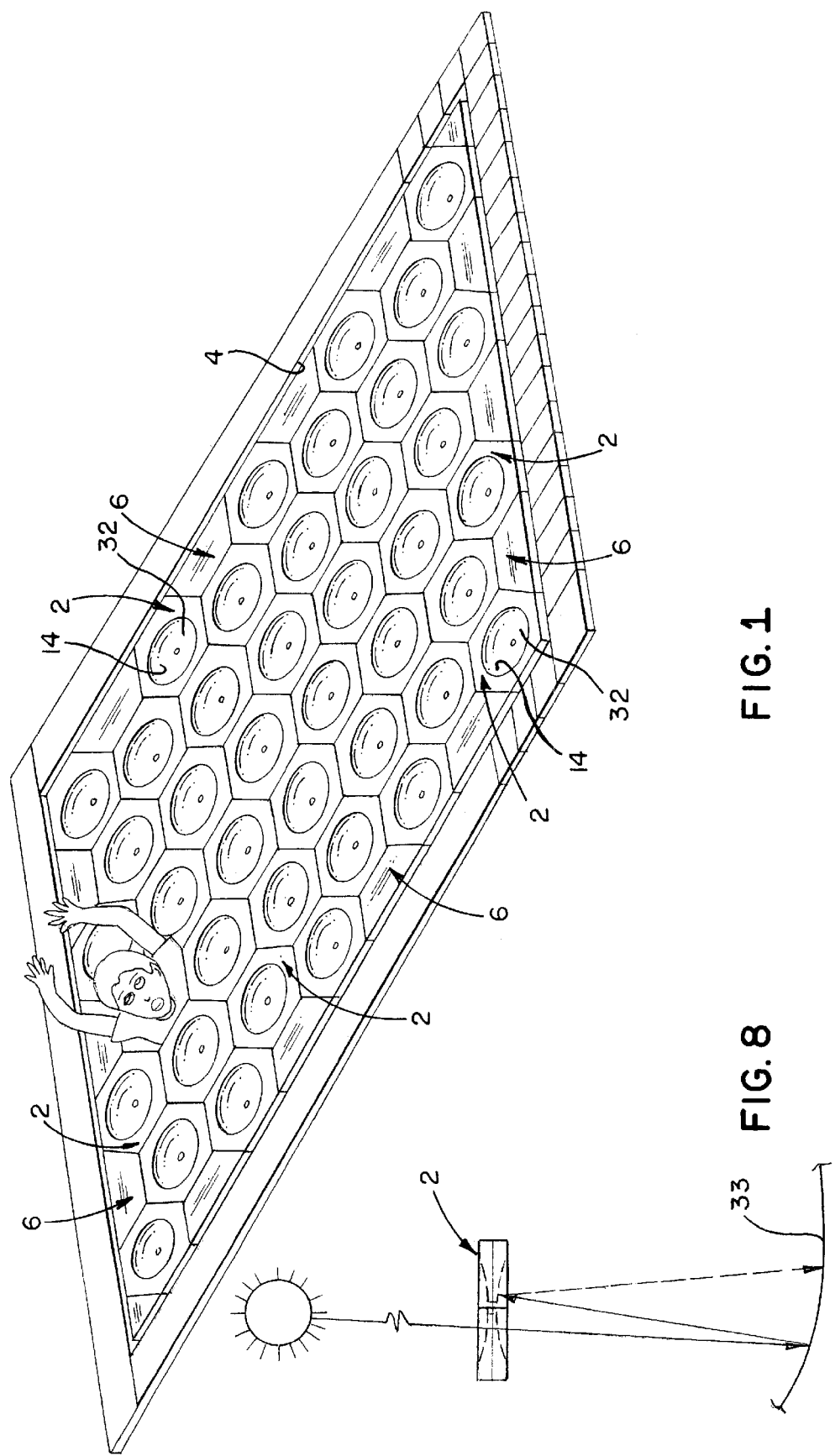
FIG. 1 is a perspective plan view of a swimming pool with the surface of the water being covered by a multiplicity of insulating devices each abutting adjacent devices to substantially fully cover the surface of the water.
FIG. 8 is a diagrammatic view illustrating light and thermal energy from the sun passing downwardly through the insulation device and the body of liquid to impinge on the bottom of the swimming pool and being reflected back through the body of liquid toward the insulation device which reflects the energy back into the body of liquid. In the interest of clarity in the illustration, the body of liquid normally disposed between the device and the bottom of the swimming pool is not shown.
Figure 2:
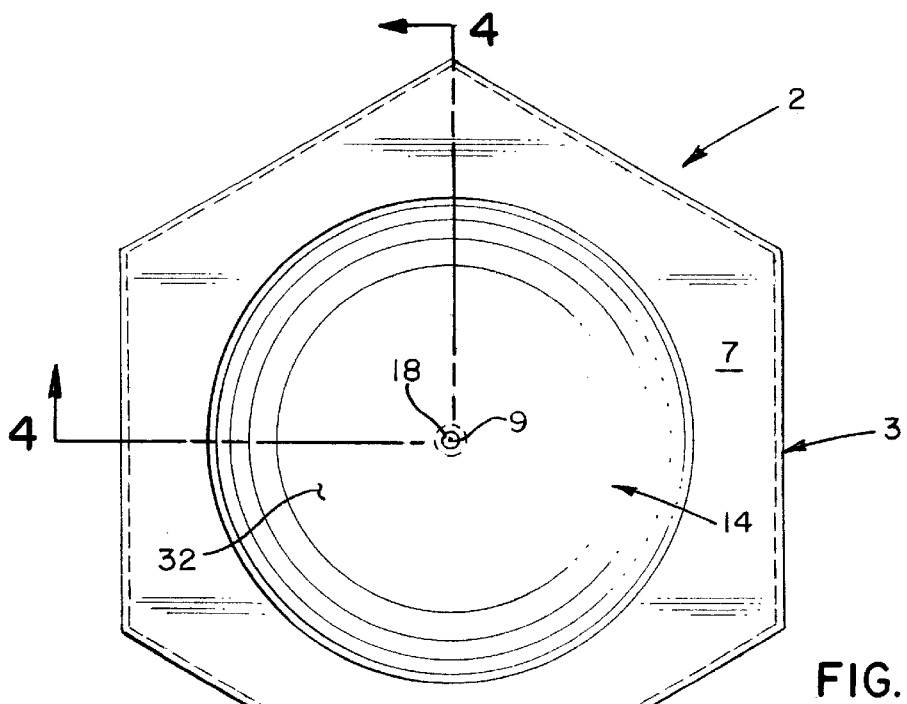
FIG. 2 a plan view of one of the insulation devices apart from other structure.

In terms of greater detail and referring to FIG. 2 of the drawings, it is seen that the insulation device of the present invention is designated generally by the numeral 2 and is fabricated in a manner to present a hexagonal outer periphery 3. By selecting this peripheral configuration it facilitates a multiplicity of the insulation devices to be associated in closely abutting relationship as illustrated in FIG. 1, where it is seen that the closely associated and abutting insulation devices substantially float on and cover the exposed surface of the water in a swimming pool. Obviously, the same effect may be obtained by placing a multiplicity of the insulation devices over other liquids such as oil, gasoline or other liquids contained in storage tanks of various shapes and sizes, the liquids sought to be stored in a manner that the temperature of the liquid may be managed in a selected manner. Where the multiplicity of hexagonal insulation devices abut against the sidewall 4 of a rectangular container or swimming pool as shown in FIG. 1 and a quadrilateral void is created between the sidewall of the container and the associated insulation devices, an auxiliary floatation insulation device having the configuration of the void may be placed to fill the void, thus preventing lateral shifting of the multiplicity of insulation devices and trapping them between the sidewalls of the container. Obviously, for containers of other and irregular configuration, auxiliary floatation insulation devices of suitable configuration may be provided to fill any voids that occur in the overall insulation cover that is formed by the multiplicity of abutting insulation devices.

Referring to FIGS. 2–7, it will be seen that each of the insulation devices is formed by two identical mirror image half shells designated generally by the numerals 7 and 8 respectively, each formed preferably by injection molding of a suitable synthetic resinous material, preferably a thermoplastic such as, by way of example, high-density polyethylene, low-density polyethylene, polypropylene, cellulose acetate, vinyl, cellulose acetate butyrate and other thermoplastics such as "Nylon" and polymethyl methacrylate sold under the trademarks "Lucite" or "Plexiglas". Other suitable materials and other methods of manufacture of the insulation device may of course be utilized without departing from the spirit of the invention.

As depicted in FIGS. 2–5, the insulation device of the invention as described above is formed from two mirror image half shells, each having a hexagonal outer periphery and a body formed symmetrically about a central axis 9. In the interest of brevity in this description, the half shell 7 will be referred to as the upper half shell while the half shell 8 will be referred to as the lower half shell as seen in these drawing illustrations. It should however be understood that in use either of the half shells may be considered to be the upper half shell while the other becomes the lower half shell. Thus, the upper half shell 7 is provided with a peripheral flat top wall portion 12 having an outer periphery that integrally intercepts the peripheral flange 13 having a hexagonal configuration and conveniently having an overall dimension of approximately six inches measured between opposed apexes with the flat peripheral flange portion connecting adjacent apexes being approximately three inches in length to thus provide an overall area of approximately 22.5 square inches. Formed integrally with the peripheral flat top wall portion 12 of the half shell 7 is a semi-spherical recess or concavity designated generally by the numeral 14 and formed by a depressed central top wall portion 16 of the top wall that circularly and symmetrically surrounds the central axis 9 to a depth of about 0.250 inches. A radius of approximately 4.625 inches measured along the central axis 9 forms the semi-spherical recess. Formed integrally with the bottom or lowest point of the depressed central top wall portion 16 and symmetrical about the central axis 9 is a tubular cylindrical member 17 the proximate end of which provides a through-hole 18 communicating with the interior of the semi-spherical recess 14 so as to drain liquid from the interior of the semi-spherical recess. The opposite or distal end edge 19 of the tubular cylindrical member 17 extends to a plane coincident with the free edge 21 of the peripheral flange 13.

As explained above, the half shell 7 is a mirror image of the half shell 8. Thus, the half shell 8 is similarly provided with a peripheral flat bottom wall portion 22 having an outer periphery that integrally intercepts the peripheral flange 23 having a hexagonal configuration and conveniently having an overall dimension of approximately six inches measured between opposed apexes with the flat peripheral flange portion connecting adjacent apexes being approximately three inches in length to thus provide an overall area of approximately 22.5 square inches. Formed integrally with the peripheral flat bottom wall portion 22 of the half shell 8 is a semi-spherical recess or concavity designated generally by the numeral 24 and formed by a depressed central bottom wall portion 26 of the bottom wall that circularly and symmetrically surrounds the central axis 9 to a depth of about 0.250 inches. A radius of approximately 4.625 inches measured along the central axis 9 forms the semi-spherical recess. Formed integrally with the bottom or lowest point of the depressed central bottom wall portion 26 and symmetrical about the central axis 9 is a tubular cylindrical member 27 the proximate end of which provides a through-hole 28 communicating with the interior of the semi-spherical recess 24 formed in the half shell 8. The opposite or distal end edge 29 of the tubular cylindrical member 27 extends to a plane coincident with the free edge 31 of the peripheral flange 23.

Figure 3:
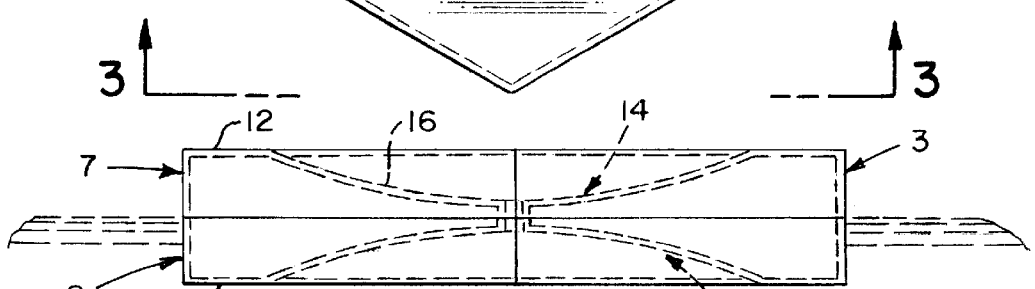
FIG. 3 is an elevational view of the insulation device taken in the direction of the arrows on the line 3—3 in FIG. 2.
Figure 4:
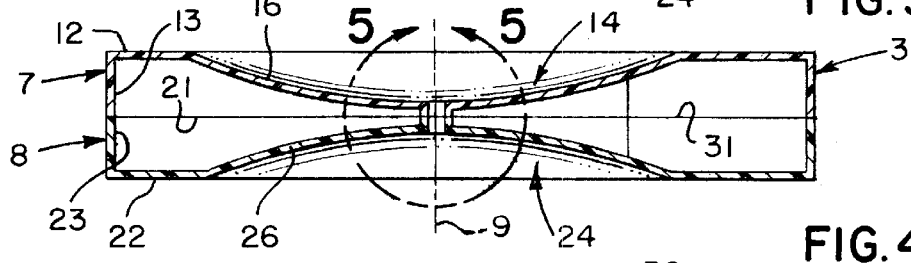
FIG. 4 is a vertical cross-sectional view taken in the plane indicated by the line 4—4 in FIG. 2.
Figure 5:
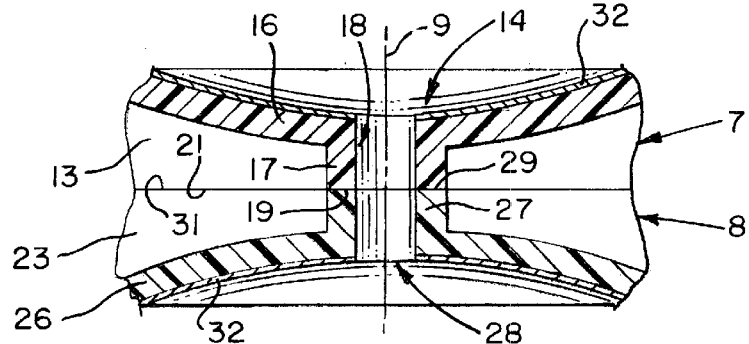
FIG. 5 is a fragmentary vertical cross-sectional view taken in the plane indicated by the line 5—5 in FIG. 4. This view is enlarged to better illustrate details of construction.
Figure 6:
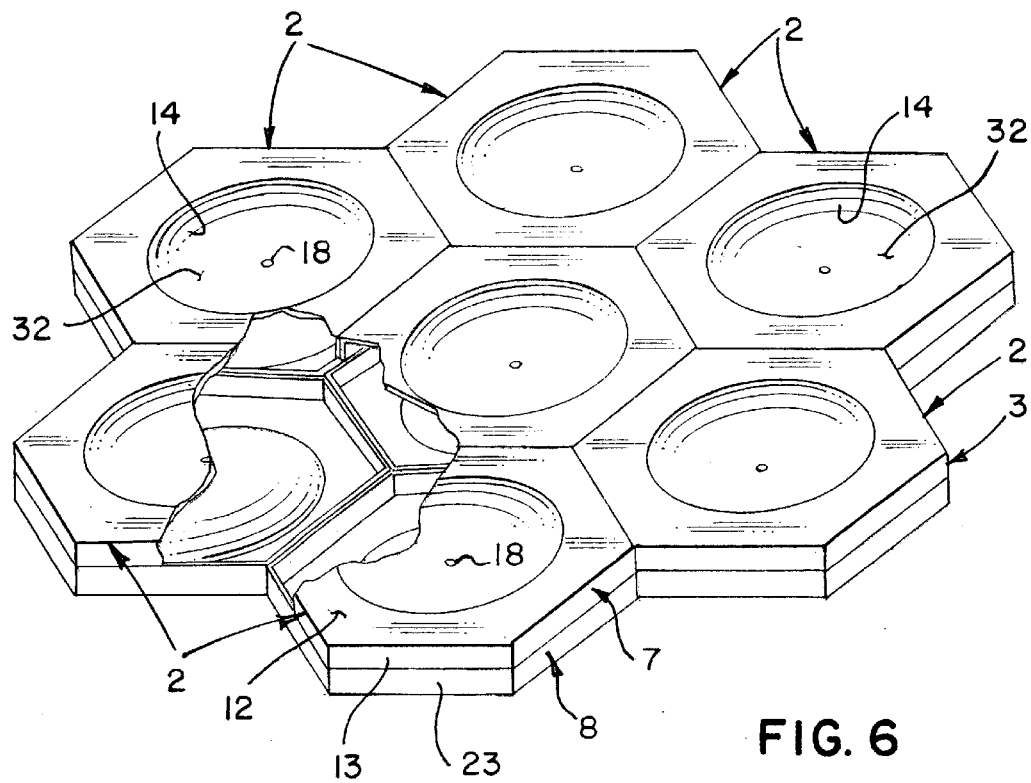
FIG. 6 is a perspective view of a multiplicity of the insulation devices arranged in abutting yet separable arrangement as they would float on a body of liquid. A portion of the walls of four of the devices are broken away to illustrate the hollow interior of each of the insulation devices.
Figure 7:
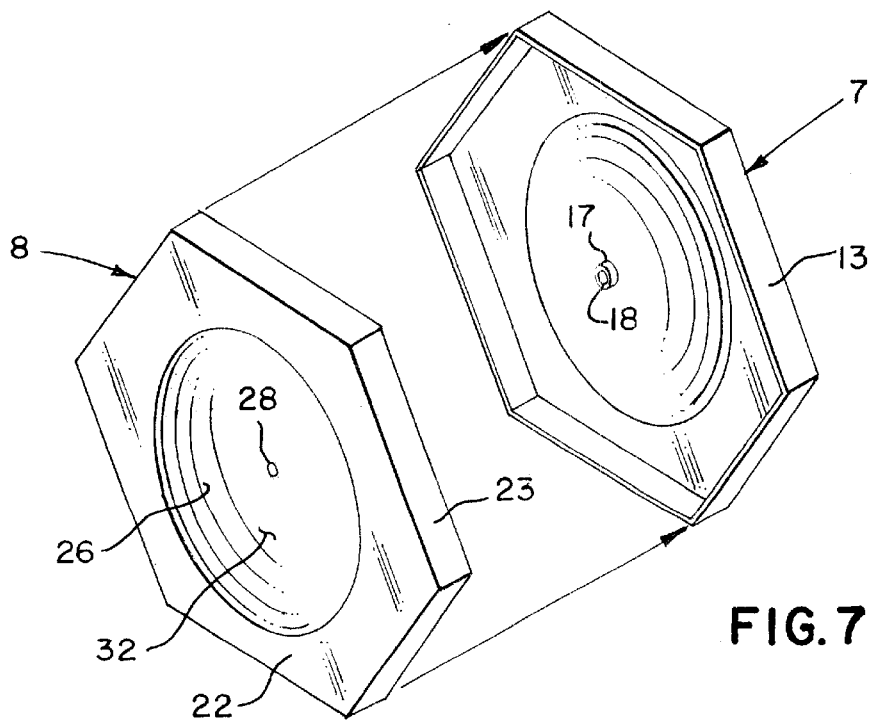
FIG. 7 is a diagrammatic view illustrating the manner in which two halves of the device are placed in mating position so as to be sealing attached along the peripheral edges of the perimeter flange and the abutting edges of the central apertured lugs.

It will thus be apparent from FIGS. 3 and 4 of the drawings that when the two mirror image half shells 7 and 8 are arranged in confronting relationship so that the hexagonal edges 21 and 31 of the half shells 7 and 8, respectively, abut one another, the end edges 19 and 29 associated with the half shells 7 and 8 also abut to form a continuous passageway between the through-holes 18 and 28, thus joining the two oppositely facing semi-spherical recesses disposed on opposite sides of the completed insulation device. These abutting edges (21/31)(19/29) of the two confronting half shell structures are then integrally joined as by electronic welding or by any other suitable method that will cause the edges to be sealed against the passage of fluid (air or water) through the sealed edges. It is anticipated that the method used for sealing these edges will depend largely on the type of synthetic resinous material is selected for formation of the two mirror image half shells 7 and 8.

In this regard, it is anticipated that sealing of the edges noted may be accomplished in an air environment or in a vacuum. In either case, the sealing of these edges will create an enclosed generally annular hollow interior defined between the two confronting and now sealed half shells 7 and 8. If the sealing is accomplished in air, the hollow interior will contain air. On the other hand, if the sealing is accomplished in a vacuum chamber, for instance, then the hollow interior will be devoid of air and the buoyancy of the completed insulation device will be somewhat increased. In either case, when placed in the water in a swimming pool, the lower portion, perhaps less than half the one inch thickness of the of the insulation device, will be submerged in the water while the upper remaining portion, probably more than half the thickness of the insulation device, will float above the water. Many different factors such as the type of liquid and the temperature of the body of liquid, will determine the extent to which submergence will occur.

In one aspect of the invention as described above, the insulation device may be defined as a "Lenslet" that functions to receive as input on the upper semi-spherical surface of the top wall a collimated beam of sunlight that is caused to diverge and spread its intensity over a larger area than the device itself. Multiple "lenslets" arranged in an "array" as illustrated in FIG. 1 will cause overlapping of the multiple sunlight beams which will distribute the heat rays from the sunlight beam with greater efficiency for absorption by the body of liquid, be it water in a swimming pool or other liquid in an appropriate container. Additionally, the thermal load absorbed by the liquid will be restricted from re-emitting from the body of liquid, thus enabling management of the temperature of the liquid to one that is necessary or desirable depending upon the use of the liquid.

It should be understood that the insulation device or "lenslet" 2 as illustrated in FIGS. 2, 3 and 4 is provided on the concave surfaces of the semi-spherical recesses with a thin layer 32 of metallic material such as titanium or a selected metal oxide, applied by vapor deposition. In some instances it is preferable that a thin layer of a dielectric material such as silicon dioxide be provided on these surfaces. The application of a selected one of these materials creates a "hot mirror" which functions to "trap" the heat that has been absorbed by the body of liquid by effecting multiple reflection at the lenslet/water interface. The "hot mirror" layer or coating 32 returns the thermal energy back to the body of liquid while reflecting only a small percentage of the light entering the pool. This effect is illustrated diagrammatically in FIG. 8 of the drawing where it is seen that a beam of sunlight which includes both light energy and thermal energy passes through the "lenslet" and through the body of liquid (not shown) that lies between the "lenslet" and the bottom 33 of the pool from whence some of the light and thermal energy is reflected back to the lenslet. Because of the presence of the "hot mirror" on the surface of the lenslet immersed in the body of liquid, the thermal energy reflected from the pool bottom back to the lenslet, as indicated by the unbroken line extending between the bottom of the pool and the underside of the lenslet, is reflected back into the body of liquid as indicated by the broken line extending from the bottom of the lenslet and the bottom of the pool. This thermal energy is thus re-absorbed by the liquid and therefore increases the efficiency by which the liquid is heated to a selected or desirable temperature.

It should be noted that while the layer of material 32 that forms the "hot mirror" has been shown on both of the concave recesses of the insulation device, it is entirely feasible to place the "hot mirror" layer of material on only one concave surface of the insulation device. Additionally, it should be noted that the "hot mirror" layer of material may be "buried" under a protective layer of material that is applied to the entire "lenslet" or insulation device to prevent "browning" of the plastic by the action of ultra-violet light and ozone on plastic that has not been formulated to prevent "browning". For purposes of providing an indicator of the location of the "hot mirror" when only one semi-spherical recess is provided with such a layer of material, one of the two mirror image half-shells that form the insulation device or "lenslet" may be fabricated from a plastic of different color so that when the multiple lenslets are distributed on the surface of the liquid, they may be oriented so that the same color shows on all of the individual lenslets that form the insulating "blanket" thereof that covers the surface of the liquid.

Having thus described the invention, what is believed to be new and novel and sought to be protected by Letters Patent is as follows.

I claim:

1. A high efficiency solar cooperable insulation device effective to manage the temperature of liquids normally exposed to sunlight and contained in reservoirs such as swimming pools and commercial liquid tanks, comprising;
   a) a buoyant body having first and second confronting spaced walls arranged about a central axis, said first and second confronting walls being transparent to energy transmitted by the sun;
   b) said first confronting wall having a flat wall portion having inner and outer peripheries, said inner periphery of said confronting flat wall portion being circularly symmetrical about said central axis;
   c) said second confronting wall having a flat wall portion having inner and outer peripheries, said inner periphery of said confronting flat wall portion being circularly symmetrical about said central axis;
   d) a semi-spherical recess in each of said first and second confronting walls, each recess symmetrically formed about said central axis with the outer peripheries of said recesses coincident and integral with the inner peripheries of said first and second confronting flat wall portions; and
   e) a peripheral wall integrally and sealingly joining the outer peripheries of said first and second confronting flat wall portions.

2. A high efficiency solar cooperable insulation device as defined in claim 1, wherein said buoyant body is hollow.

3. A high efficiency solar cooperable insulation device as defined in claim 1, wherein said outer peripheries of said first and second confronting flat wall portions are hexagonal and said peripheral walls integrally and sealingly joining the outer peripheries of said first and second confronting wall portions are hexagonal.

4. A high efficiency solar cooperable insulation device as defined in claim 1, wherein said semi-spherical recesses formed in said first and second confronting walls open in opposite directions.

5. A high efficiency solar cooperable insulation device as defined in claim 1, wherein said semi-spherical recesses formed in said first and second confronting walls open in opposite directions and a passageway is provided communicating the interior of one recess with the interior of the other recess.

6. A high efficiency solar cooperable insulation device as defined in claim 1, wherein said buoyant body is formed from a synthetic resinous material selected from the group consisting of high-density polyethylene, low-density polyethylene, polypropylene, cellulose acetate, vinyl, cellulose acetate butyrate and polymethyl methacrylate.

7. A high efficiency solar cooperable insulation device as defined in claim 1, wherein the surface of at least one of said recesses is coated with a thin layer of metallic material selected from the group consisting of titanium and metal oxides.

8. A high efficiency solar cooperable insulation device as defined in claim 6, wherein said buoyant body is coated with a protective layer that prevents "browning" of the synthetic resinous material as a result of the action of ultra-violet light and ozone on the synthetic resinous material.

9. A high efficiency solar cooperable insulation device effective to manage the temperature of liquids normally exposed to sunlight and contained in reservoirs such as swimming pools and commercial liquid tanks, comprising;
   a) a buoyant body having first and second confronting spaced walls arranged about a central axis, said first and second confronting walls being transparent to energy transmitted by the sun;
   b) said first confronting wall having a flat wall portion having inner and outer peripheries, said inner periphery of said confronting flat wall portion being circularly symmetrical about said central axis and said outer periphery of said confronting flat wall portion constituting an integral flange perpendicular to said flat wall portion and having a distal end edge;
   c) said second confronting wall having a flat wall portion having inner and outer peripheries, said inner periphery of said confronting flat wall portion being circularly symmetrical about said central axis and said outer periphery of said confronting flat wall portion constituting an integral flange perpendicular to said flat wall portion and having a distal end edge;
   d) a semi-spherical recess in each of said first and second confronting walls, each recess symmetrically formed about said central axis with the outer peripheries of said recesses coincident and integral with the inner peripheries of said first and second confronting flat wall portions;
   e) a tube coincident with said central axis integrally connecting and providing a passageway between the spherical recesses in said first and second confronting walls; and
   f) the distal end edges of said integral flanges perpendicular to said flat wall portions are integrally and sealingly joined to form a unitary hollow body.

10. The high efficiency solar cooperable insulation device as defined in claim 9, wherein said integral flanges constituting the outer peripheries of said first and second flat wall portions define confronting hexagons.

11. The high efficiency solar cooperable insulation device as defined in claim 9, wherein said semi-spherical recesses formed in said first and second confronting walls open in opposite directions.

12. The high efficiency solar cooperable insulation device as defined in claim 9, wherein said buoyant body is formed from a synthetic resinous material selected from the group consisting of high-density polyethylene, low-density polyethylene, polypropylene, cellulose acetate, vinyl, cellulose acetate butyrate and polymethyl methacrylate.

13. The high efficiency solar cooperable insulation device as defined in claim 9, wherein the surface of at least one of said recesses is coated with a thin layer of metallic material selected from the group consisting of titanium and metal oxides.

14. The high efficiency solar cooperable insulation device as defined in claim 13, wherein said buoyant body is formed from a synthetic resinous material selected from the group consisting of high-density polyethylene, low-density polyethylene, polypropylene, cellulose acetate, vinyl, cellulose acetate butyrate and polymethyl methacrylate.

15. The high efficiency solar cooperable insulation device as defined in claim 14, wherein said buoyant body is coated with a protective layer that prevents "browning" of the synthetic resinous material as a result of the action of ultra-violet light and ozone on the synthetic resinous material.

* * * * *